DAMPING MEANS FOR A PICKUP CARTRIDGE

Filed April 2, 1964 2 Sheets-Sheet 1

INVENTOR:
WILLIAM A. CAVAGNARO,
BY Thomas A. Briody
HIS ATTORNEY.

INVENTOR:
WILLIAM A. CAVAGNARO,
BY Thomas A. Briody
HIS ATTORNEY.

3,321,207
DAMPING MEANS FOR A PICKUP CARTRIDGE
William A. Cavagnaro, Decatur, Ill., assignor to General Electric Company, a corporation of New York
Filed Apr. 2, 1964, Ser. No. 356,815
7 Claims. (Cl. 274—24)

This invention relates to an improved electro-mechanical transducing assembly for audio reproduction, and more particularly to an improved damping means for such a transducing assembly.

An important object of the present invention is to provide an improved tone arm and cartridge assembly of the type wherein the cartridge is supported for pivotal movement relative to the tone arm.

Another object of my invention is to provide an improved damping means for cushioning relative movement of a cartridge assembly with respect to a tone arm.

An additional object of my invention is to provide an improved damping means for a cartridge assembly, which is efficient, dependable, and economical to manufacture.

A still further object of my invention is to provide an improved means for damping vibrations incident to relative movement between a cartridge assembly and a tone arm, which damping means is characterized by structural stability, and improved control over the resilient performance of the damping means.

In accordance with my invention, in one form thereof, there is provided an elongated tone arm. Upon this tone arm, near its free end, there is pivotally supported a pick-up cartridge assembly including a record tracking stylus. The cartridge assembly is arranged to pivot relative to the tone arm when the stylus engages a record to be played. With this arrangement, in accordance with my invention, a triangularly configured damping element is secured to the tone arm adjacent the cartridge assembly. This damping element is constructed from an elastomeric material, and it cushions relative movement between the cartridge assembly and the tone arm when the stylus engages a record to enhance the quality of performance achievable by the cartridge and tone arm combination.

Further aspects of my invention shall become apparent hereinafter, and the specification concludes with claims particularly pointing out and distinctly claiming the subject matter which I regard as my invention. The invention itself, however, both as to organization and method of operation, as well as additional objects and advantages thereof, will best be understood from the following description, when read in conjunction with the accompanying drawings, in which:

Figures 1, 2, 3, 5, 6, 7, 8:
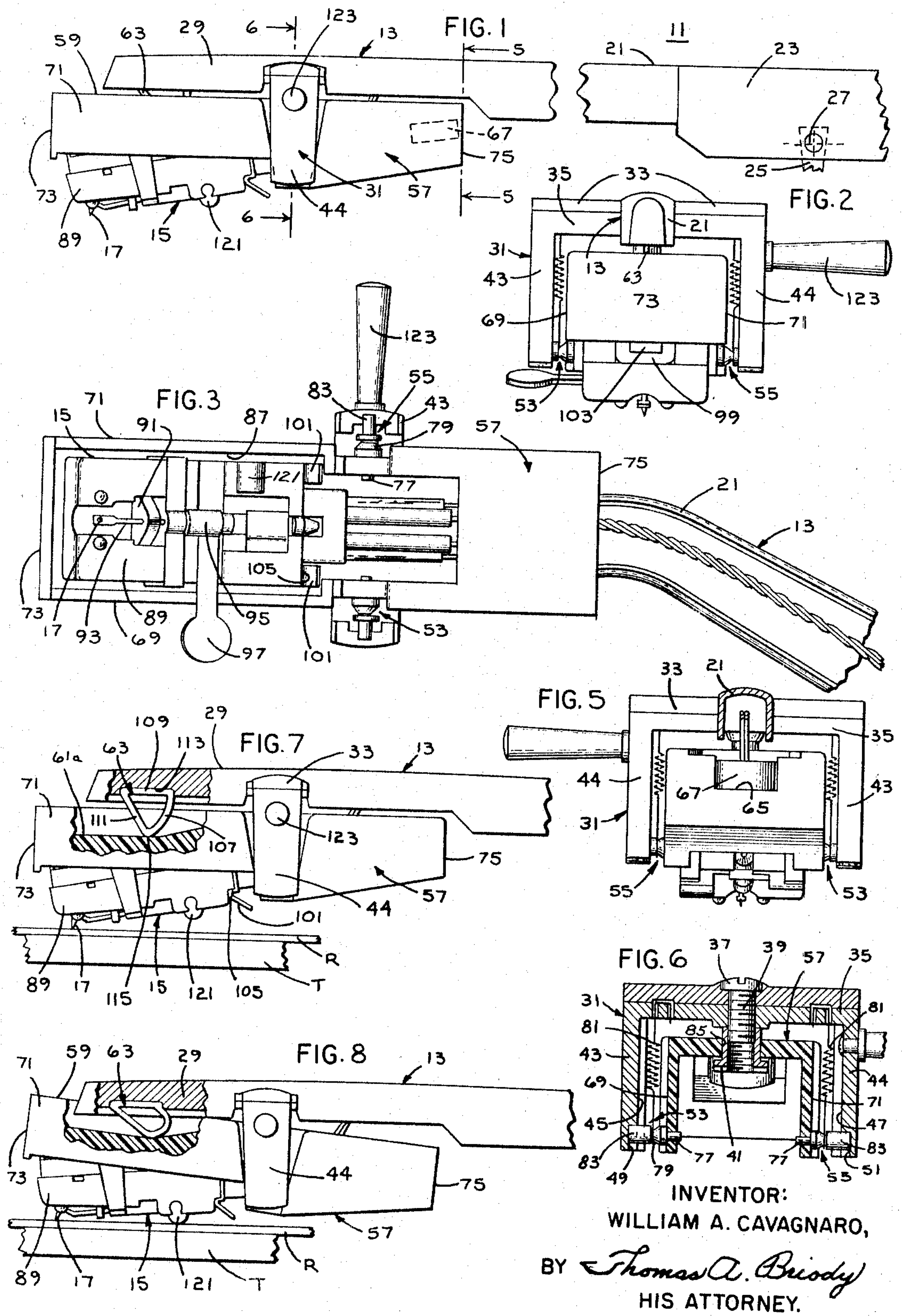
FIG. 1 is a side elevation view of an improved cartridge and tone arm assembly embodying my invention, the cartridge being shown mounted on the free end of a fragmentarily illustrated tone arm.
FIG. 2 is a front view of the assembly shown in FIG. 1.
FIG. 3 is an enlarged bottom view of the assembly shown in FIG. 1.
FIG. 5 is a cross-sectional view taken generally along the line 5—5 of FIG. 1.
FIG. 6 is a cross-sectional view taken generally along the line 6—6 of FIG. 1.
FIG. 7 is a fragmentary view similar to FIG. 1, but showing the cartridge and tone arm partly broken away to illustrate the triangular shaped damping element, and showing the record tracking stylus in playing engagement with a record.
Figure 9:
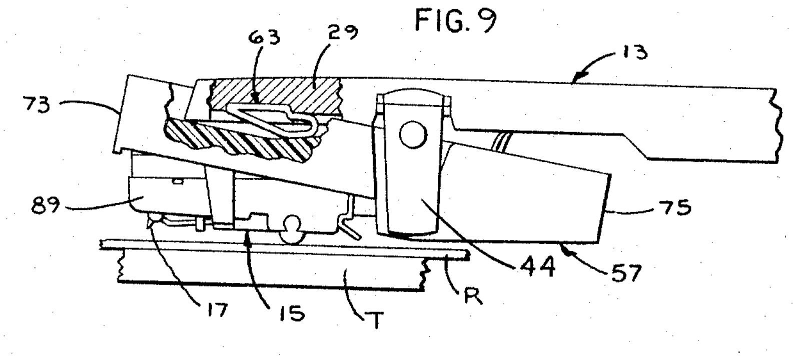

FIG. 8 is a view similar to FIG. 7, but showing the relative positions of the cartridge and tone arm after an abnormal downward vertical pressure is applied to the top of the free end of the tone arm; and FIG. 9 is a view similar to FIG. 7 showing the relative positions of the cartridge and tone arm after a substantial downward vertical pressure is applied to the top of the free end of the tone arm.

Referring first to FIGS. 1–5, there is shown a cartridge and tone arm assembly 11 embodying one form of my invention.

The assembly 11 includes an elongated tone arm 13 having a cartridge 15 mounted thereon. The cartridge 15 has at least one stylus 17 adapted to track in the groove of a sound reproducing record R (FIGS. 7–9).

The tone arm 13 includes an elongated body comprising a tubular arm section 21 extending outwardly in cantilever fashion from pivotally supported portion 23. As shown in FIG. 1, rear portion 23 of the tone arm body is pivotally secured to a suitable support 25, to provide a substantially horizontal tone arm axis 27 about which the tone arm rocks incident to the placing of the tone arm on the record R and lifting the tone arm from the record. The pivoting of the tone arm 13 about the tone arm axis 27 permits a wide range of vertical movement of the tone arm and thereby enables a substantial group of stacked records to be accommodated on the record spindle of an automatic changer without imparing the effective operation of the assembly 11.

To enable the cartridge 15 to be pivotally supported on tone arm 13, there is provided near free end 29 of arm 13 a U-shaped frame 31. More particularly, as shown in FIG. 2, a pair of transverse shoulders 33 are formed integrally to tubular arm section 21 of the tone arm 13 near its free end 29. The shoulders 33 extend outwardly from opposite sides of arm section 21, and are secured in overlying relationship to base 35 of frame 31 by means of the threaded securement of screw 37 (extending downwardly from above arm section 21), as shown in FIG. 6, to the base 35. It will also be noted that the threaded shank 39 of screw 37 (FIG. 6) is long enongh so that it extends downwardly for a considerable distance from the bottom of base 35 of frame 31. The reason for this is to enable screw 37 to engage nut 41, which helps to positively couple the cartridge 15 to the tone arm 13, as shall be set forth in detail hereinafter.

The frame 31 is thus rigidly secured to the underside of the tone arm 13 near its free end 29, as shown in FIG. 2, and arms 43, 44 of frame 31 depend in a vertical direction from base 35. On the bottom of the arms 43, 44 of frame 31, at inwardly facing surfaces 45 and 47 thereof (FIG. 6), there is formed a pair of bearing slots 49, 51. The slots 49, 51 receive and pivotally support a pair of trunnions 53, 55, which are rotatably journalled therein to faciliate pivotal movement of the cartridge 15 relative to the tone arm 13.

In order to protect the cartridge 15 and records associated therewith from possible damage due to sudden and severe jarring, as shown in FIGS. 1, 2 and 6, there is provided a carrier member 57 located exteriorly of and on the underside of free end 29 of the tone arm 13. The carrier member 57 may be fabricated from a readily manufacturable and durable metal such as aluminum, having sufficient mass for the application. The outer periphery of member 57 is generally box-shaped and oblong. Top 59 of member 57 has an elongated recess 61 (FIG. 4) formed therein to enable it to cooperate with a damping element 63 and the free end 29 of tone arm 13. Near the right side of the top 59 of member 57 (viewing FIG. 4), there is formed a recess 65 for receiving a counterbalancing weight 67. (See also FIG. 5.)

The particular construction and arrangement of the cartridge 15 and carrier member 57 on tone arm 13, and the utilization of a damping element between carrier member 57 and tone arm 13, comprises the invention of Roy Dally and is described and claimed in his co-pending application Ser. No. 356,814 filed concurrently herewith and assigned to the same assignee as the present invention.

Figure 4:
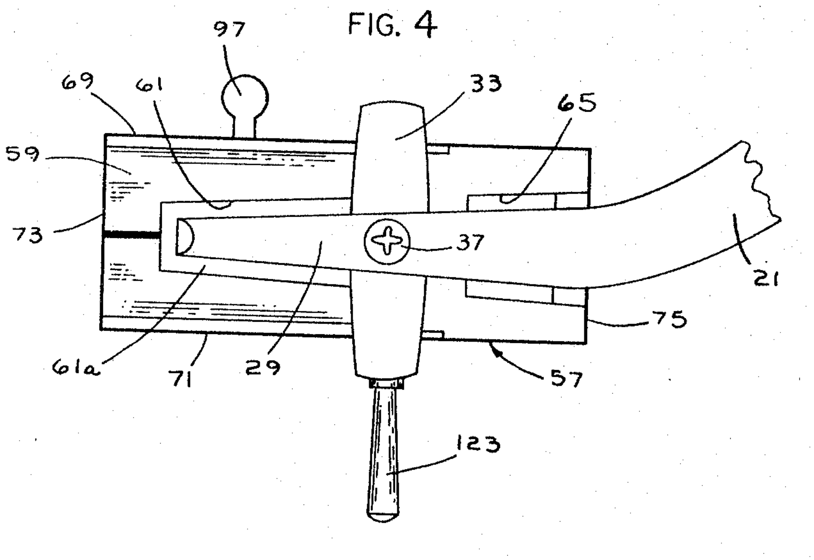
FIG. 4 is a top view of the assembly shown in FIG. 1.

The elongated side walls 69 and 71 of member 57 are arranged in mutually parallel relationship, and they are also parallel to the longitudinal axis of the free end 29 of the tone arm (FIG. 4). Between the front end 73 and rear end 75 of the carriage member 57, but closer to rear end 75 thereof, as shown in FIG. 3, the trunnions 53 and 55 are suitably secured to and project outwardly in transverse fashion from side walls 69 and 71, respectively. Thus, more particularly, as shown in FIG. 6, each of the trunnions 53, 55 includes a shank portion 77 which extends through and is secured to an associated side wall of member 57, an annular notch 79 for receiving the looped bottom end of a tension spring 81, and a rotatable cylindrical section 83 which is seated in one of the bearing slots 49, 51 of frame 31. The member 57 is spring biased upwardly in a vertical direction to engage bearing slots 49, 51 by means of the two tension springs 81, which have their upper looped ends wrapped around associated ribs of the base 35 of frame 31 (as shown in FIG. 6). With such an arrangement, the carriage member 57 is thereby rotatably journalled in the bearing slots 49, 51 of arms 43, 44 of the tone arm.

To help prevent undesirable downward and lateral movement of carriage member 57 from its pivotal support, the bottom threaded section of screw 39 cooperates with headed nut 41, as shown in FIG. 6. Nut 41 extends loosely through an elongated slot 85 formed in the top of the carriage member and has its head located underneath the bottom surface of the top wall of the carriage member 57 wherein slot 85 is located.

Turning now to a more detailed description of the arrangement of cartridge 15 in the carriage member 57, attention is directed initially to FIGS. 1–3. As shown therein, the cartridge 15 is mounted within a recessed cavity 87 (FIG. 3) on the underside of carriage member 57 so that its longitudinal axis is inclined downwardly from rear to front at an acute angle relative to the longitudinal axes described respectively by the free end portion 29 of the tone arm (FIG. 1) and the carriage member 57 (viewing FIG. 1). Thus, as shown in FIG. 1, the cartridge 15 is directed downwardly and to the left from the rear to front, and depends from the underside of carriage member 57. It will be further noted that the carriage member 57 is longer on the left side of its pivotal axis (viewing FIG. 1) than on the right side thereof, and that the cartridge 15 is also located on the left side of the axis of rotation of the carriage member.

The cartridge 15 shown is of the ceramic stereo type, and it comprises a housing 89 which may be composed of upper and lower parts attached together by rivets (not shown). The interior of the housing 89 is partly hollow, and contains a pair of elongated ceramic transducer elements (not shown) and a resilient element 91 for coupling these elements to an elongated drive rod 93. The drive rod 93 has the stylus 17 secured to the underside of its free end (as shown in FIGS. 1 and 7), and it is secured to a barrel member 95 (FIG. 3) which is removably located in cartridge 15. The drive rod 93 and barrel member 95 form a stylus assembly for the cartridge unit, the positioning of which may be adjusted by the rotatable manipulation of an arm 97 which is secured to the barrel member 95.

The cartridge 15 is removably seated in secure engagement with carriage member 57 by means of the cooperation of front and rear clip sections 99 (FIG. 2) and 101 (FIG. 3) respectively, with projection 103 and shoulders 105 of the cartridge housing. Thus, as shown in FIG. 2, projection 103 on the front end of the cartridge housing, extends through a mating aperture of clip section 99, and the rear clip sections 101 engage underneath associated shoulders 105. The cartridge 15 may thus be readily and removably inserted into cooperative securement with carriage member 57.

Turning now to an important aspect of my invention whereby there is provided a novel and improved means for resiliently cushioning the movement of the carrier member 57 relative to the tone arm 13, attention is directed to the construction of the damping element 63, as shown in FIGS. 7–9. The element 63 is preferably molded from a rubber-like material; i.e., a material that is highly resilient, readily deformable and has a rapid and complete restoring force so that it will quickly return to its original shape upon being deformed and then released. Butyl, having a Shore "A" durometer hardness range of from about 35 to 55, is a suitable rubber-like material, as is rubber itself.

The element 63 is molded into the general configuration of a triangle (FIG. 7) which has one outwardly concave side 107 joined at its ends to a pair of intersecting divergent equilateral and straight sides 109 and 111. As further suggested by viewing FIG. 2, the element 63 is uniformly flat or coplanar in depth (being similar in flatness to the coupling element 91 of FIG. 3), and has a relatively small depth in a direction transverse to the longitudinal axis of the tone arm (e.g. 0.060 inch). Thus, briefly stated, the element 63 is a triangularly configured elastomeric piece disposed substantially in a single plane. The plane in which element 63 is disposed is a vertical plane perpendicular to the axis of rotation of carriage member 57.

A generally horizontal surface 113 (FIG. 7) is formed in the recessed underside of tone arm 13, near the extreme free end thereof. Upper side 109 (FIG. 7) of the element 63 is secured to surface 113 of tone arm 13, by a bonding cement so that lower straight side 111 and concave side 107 depend downwardly therefrom. The lower corner 115 of the resilient element 63 engages the bottom horizontal surface *61a* of the recess 61 of carriage member 57 and compressibly cooperates therewith to cushion the relative movement of cartridge 15 relative to tone arm 13, in the manner illustrated by a comparison of FIGS. 7–9.

From a comparison of the arrangement of element 63 in FIG. 8 with the arrangement of element 63 in FIG. 7 it will thus be understood that element 63 is compressibly sandwiched between the upper and left side of carriage member 57 and the lower left and free end of the tone arm, to cushion relative movement of these portions of the assembly toward each other. Such relative movement occurs when the carriage member 57 upon which the cartridge is mounted, is rotated through a small angle in a clockwise direction about its pivots (e.g. from its FIG. 7 to FIG. 8 positions).

When compression of the damping element 63 occurs, the upper straight side 109 serves as a stationary support for the resilient unit and the lower straight side 111 tends to pivot about its intersecting connection to side 109 in a counterclockwise direction of rotation (FIG. 7) through a relatively small angle. As the lower straight side 111 of the resilient element 63 pivots in a counterclockwise direction, the concave side 107 thereupon bulges radially outwardly and rearwardly away from the straight sides 109, 111, producing in effect an outwardly concave side tending to have a radius smaller than the radius of curvature of side 107 before compression of the unit 63. In view of the fact that the compressive bulging of concave side 107 is radially outwardly and away from the straight sides 109, 111 of unit 63, the movable lower side 111 is thereby allowed to move toward stationary side 109 through a substantial angle (e.g. compare FIG. 9 with FIG. 7). It will thus be seen that the construction and arrangement of element 63 lends itself to an improved resilient damping capability.

Upon compression of element 63 it will be further understood that due to the configuration and arrangement of the resilient element, the flexure of pivoting side 111 and bulging side 107 occurs in the plane of disposition of element 63. Such an arrangement helps to provide consistency of operation of the resilient element 63.

Because the resilient element has a generally triangular configuration it has an inherent structural stiffness, but readily collapses, as shown in FIGS. 8 and 9, when a compressive force is exerted thereupon. The structural stability of the element 63 helps to enhance the overall performance and operative life of the tone arm and cartridge assembly 11.

For normal playing operation, as shown in FIG. 7, the stylus 17 of cartridge 15 is in normal playing engagement with the grooves of record R upon turntable T. The longitudinal axis of carriage member 57 and the longitudinal axis of the free end 29 of the tone arm are then generally parallel to the surface of the record R. With the cartridge 15 and tone arm 13 in this position, the corner 115 of element 63 engages and exerts a relatively small compressive force upon surface 61*a* of the carrier member 57. This force is exerted in a vertical direction (viewing FIGS. 7–9) and it provides a shock absorbing effect for protecting the cartridge and its components as well as records being played, during the normal operation of the phonograph and tone arm cartridge assembly.

At certain frequencies, depending upon the resonant frequency of the cartridge and its mounting, the assembly will usually resonate. By using a resilient damping means such as element 63 between the cartridge and tone arm, the resultant vibrations incident to the resonant frequency of the cartridge and mounting are effectively quelled.

It will thus be seen that the triangular shaped elastomeric element 63 provides a flexible mechanical connection between the pivoted cartridge supporting carrier 57 and the free end 29 of the tone arm 13, which provides stability of operation and performance of the tone arm and cartridge assembly, and in particular it also provides a shock absorbing protection for the cartridge and components against vertically directed forces.

As further examples of the protection provided by the resilient element 63, attention is also directed to FIGS. 8 and 9. For FIG. 8, an abnormal downward vertical force is imparted to the top of the free end of the tone arm. The longitudinal axis of member 57 is thereupon directed upwardly and angularly from the surface of record R (from rear 75 to front 73 of member 57). The free end tip of tone arm end 29 enters recess 61 of member 57. The element 63 thereupon compresses to a greater degree, as shown in FIG. 8, to resiliently cushion the relative movement of the cartridge carrying member with respect to the free end of the tone arm.

As shown in FIG. 9, when a substantial downward vertical thrust is imparted to the top of the free end 29 of the tone arm 13, the resilient element 63 is compressed substantially to effectively cushion the relative movement of the cartridge carrier 57 with respect to tone arm 13.

As further illustrated in FIGS. 7–9, on the bottom side of the cartridge housing 89, near shoulders 105 thereof (FIG. 7) there is arranged a resilient bumper 121. The resilient bumper 121 includes the semi-cylindrical bottom which faces downwardly from the bottom of the cartridge housing and is arranged for resilient engagement with a record in a manner illustrated in FIGS. 8 and 9.

Bumper 121 serves as a cushion to help protect the record against otherwise possible abrasion due to engagement of the cartridge housing 89 with the record. In addition, resilient bumper 121 also serves as a fulcrum to enable the cartridge supporting carriage 57 to pivot thereabout for disengagement of the stylus 17 from a record upon the exertion of a substantial downward vertical force on the upper surface of the free end 29 of the tone arm 13.

As shown in FIG. 8, a sufficient downwardly directed force has been exerted on the free end of the tone arm 13 to cause the bumper 121 to protectively engage the surface of record R, but this force is not sufficient for pivoting the carriage member 57 about bumper 121 to thereby cause the stylus 17 to disengage the record. However, as shown in FIG. 9, a substantial vertical force has been exerted upon the free end of the tone arm and as a result of the magnitude of this force, the carriage member 57 has pivoted in a clockwise direction of rotation (viewing FIG. 8) about fulcrum bumper 121 until the stylus 17 disengages the record R.

As further shown in FIGS. 3 and 5, to enable the tone arm 13 to be readily removed from a record in manual fashion, or otherwise manipulated, an elongated handle 123 is arranged on upright section 44 of the frame 31 of the tone arm 13. Handle 123 may be readily grasped by the operator of the phonograph in order to locate the tone arm at the desired position on a record or at its rest position.

It will now therefore be seen that my new and improved tone arm and cartridge arrangement provides a novel damping structure for cushioning relative movement of a pivotally supported cartridge with respect to a tone arm.

While in accordance with the patent statutes, I have described what at present is considered to be the preferred embodiment of my invention, it will be obvious to those skilled in the art that various changes and modifications may be made therein without departing from the invention and, I, therefore, aim in the following claims to cover all such equivalent variations as fall within the true spirit and scope of the invention.

What I claim and desire to secure by Letters Patent of the United States is:

1. A tone arm and cartridge assembly comprising an elongated tone arm, pickup cartridge means including a record-tracking stylus pivotally supported by said tone arm near the free end thereof, said cartridge means being arranged to pivot relative to said tone arm upon engagement of said stylus with a record to be played, and a resilient damping member arranged between adjacent surfaces of said cartridge means and tone arm to cushion relative movement of said cartridge means with respect to said tone arm upon engagement of said stylus with said record, said damping member having a triangular configuration.

2. A tone arm and cartridge assembly comprising an elongated tone arm, pickup cartridge means including a record tracking stylus pivotally supported by said tone arm near the free end thereof, said cartridge means being arranged to pivot relative to said tone arm upon engagement of said stylus with a record to be played, and a resilient damping means arranged between adjacent surfaces of said cartridge means and tone arm to cushion relative movement of said cartridge means with respect to said tone arm upon engagement of said stylus with said record, said damping means including at least three sides, a first side of said damping means being secured to one of said surfaces, a second side of said damping means having a first end connected to a first end of said first side, said second side of said means being arranged to pivot about its first end with respect to said first side of said means, and a third side of said damping means connected at its ends respectively to second ends of said first and second sides, said third side being compressible between said second ends of said first and second sides in response to engagement of the other adjacent surface of said cartridge means and tone arm with said damping means thereby to control pivotal movement of said second side of said damping means relative to said first side thereof.

3. The tone arm and cartridge assembly described in claim 2 wherein the resilient damping means is an element constructed from butyl rubber.

4. The tone arm and cartridge assembly described in claim 2 wherein the resilient damping means has a generally triangular configuration, the first, second and third sides of said damping means comprising the sides of said triangular configuration, said first and second sides of said damping means being substantially straight, and said third side of said damping means being outwardly concave, thereby enabling said second side to move toward said first side to a substantial extent.

5. The tone arm and cartridge assembly described in claim 4 wherein the resilient damping means is an element constructed from butyl rubber.

6. A tone arm and cartridge assembly comprising an elongated tone arm, cartridge means including a record-tracking stylus pivotally supported by said tone arm near the free end thereof, said cartridge means being arranged to pivot relative to said tone arm about a horizontal axis upon engagement of said stylus with a record to be played, and a substantially coplanar damping member of elastomeric material disposed in a vertical plane perpendicular to said axis, said damping member being constructed of butyl rubber and having a substantially triangular configuration, one side of said damping element being shaped in such a manner that it is adapted to move outwardly and away from the intersection of the other two sides upon application of compressive forces to said damping member, said damping member being arranged between adjacent surfaces of said cartridge means and tone arm and movable in said vertical plane to cushion relative movement of said cartridge means with respect to said tone arm upon engagement of said stylus with said record.

7. A tone arm and cartridge assembly comprising an elongated tone arm, pickup cartridge means including a record tracking stylus pivotally supported by said tone arm near the free end thereof, said cartridge means being arranged to pivot relative to said tone arm upon engagement of said stylus with a record to be played, and a resilient damping means arranged between adjacent surfaces of said cartridge means and tone arm to cushion relative movement of said cartridge means with respect to said tone arm upon engagement of said stylus with said record, said damping means including a wafer thin element of molded elastomeric material having a substantially uniform transverse thickness, said element having at least two sides, a first side of said element being secured to one of said surfaces, a second side of said element having a first end connected to a first end of said first side, said second side of said element being arranged to pivot about its first end with respect to said first side of said element, and a portion of elastomeric material disposed between said sides thereby to resiliently control relative movement between said sides, a second end of said second side of said element being resiliently engageable with the other adjacent surface of said cartridge means and tone arm and resiliently movable relative to a second end of said first side of said element thereby to cushion the relative movement of said cartridge means with respect to said tone arm, said second end of said second side of said element being normally disposed a substantial distance from said first side relative to the thickness of said element.

References Cited by the Examiner

UNITED STATES PATENTS

| | | | |
|---|---|---|---|
| 2,485,137 | 10/1949 | Brown et al. | 274—24 |
| 2,643,886 | 6/1953 | Ghilini | 274—24 X |

NORTON ANSHER, *Primary Examiner.*

CLIFFORD B. PRICE, *Examiner.*

J. F. PETERS, *Assistant Examiner.*